United States Patent
Tsai

[11] Patent Number: 6,019,343
[45] Date of Patent: Feb. 1, 2000

[54] MULTI-OPERATION DISCHARGE CONTROL DEVICE

[76] Inventor: Tung-Po Tsai, No. 56, Min Sheng Street, Feng-Yuan City 420, Taiwan

[21] Appl. No.: 09/192,352

[22] Filed: Nov. 16, 1998

[51] Int. Cl.[7] .................................................. F16K 31/12
[52] U.S. Cl. .................. 251/30.02; 251/40; 251/129.03; 251/129.04
[58] Field of Search ........................................ 251/129.03

[56] References Cited

U.S. PATENT DOCUMENTS

| | | | |
|---|---|---|---|
| 4,709,728 | 12/1987 | Ying-Chung | 251/129.04 X |
| 5,092,560 | 3/1992 | Chen | 251/129.03 X |
| 5,358,213 | 10/1994 | Pilolla | 251/129.03 |
| 5,699,994 | 12/1997 | Wu | 251/129.03 |

Primary Examiner—Stephen M. Hepperle
Assistant Examiner—John Bastianelli

[57] ABSTRACT

A multi-operation discharge control device is provided, the device includes a lower housing having a water inlet and outlet, a valve set slidably and axially disposed in the upper portion of the lower housing, a manual operation system slidably and transversely disposed into a lateral extension opposite to the water inlet of the lower housing, an upper housing axially connected to the lower housing including an automatic operation system therein. The automatic operation system contains an electromagnetic valve and an IC plate. Thereby the valve set is selectively actuated manually or automatically to move upward to define a water passage in the lower housing permitting the water to flow from the water inlet to the water outlet of the housing.

2 Claims, 9 Drawing Sheets

MULTI-OPERATION DISCHARGE CONTROL DEVICE

BACKGROUND OF THE INVENTION

The present invention relates to water discharge control devices and more particularly to a multi-operation discharge control device which controls the water discharge manually or electronically.

Prior water discharge control device as shown in FIG. 8 and 9 comprises generally a tubular housing 5 including a water inlet 10 and a water outlet 11, an outer cap 1 protecting an inner cap 2 on the top, a water discharge stem 3 slidably extending downward from a valve 7 at a center of the housing 5 and engaged with a plastic tube 9, a water sealing ring 6 connected between the valve 7 and the inner cap 2 and reinforced with washer 8 on an underside, a small hole 71 formed in the sealing ring 6, an actuator 12 of T-shaped section centrally and movably engaged into a flare nut 13 and a pushing rod 14 of T-shaped section having a cylinder portion 141 slidably engaged into a first and a second tubular supports 16 and 17 and biased by a spring 15 and a circular end portion 142 stepped against a circular end 121 of the actuator 12.

Normally, the water form the water inlet 10 enters into the upper portion of the housing through the small hole 71 of the sealing ring 7 and the water pressures on both sides of the sealing ring 7 are balanced so that the water from the inlet 10 is sealed by the sealing ring 7 and can not flow to the water outlet 11. However, when the actuator 12 is pressed aslant to either direction, its circular end 121 will actuate the pushing rod 14 sliding forward to push the water discharge stem 3 slanting laterally relative to the longitudinal center of the housing 5 so that the sealing ring 7 is partially moved upward and the balance of the water pressures on either sides is lost so as to force the water in the upper portion of the housing 5 flowing out via the small hole 71. In addition to that, the water pressure under the sealing ring 7 becomes greater and greater to force the sealing ring 7 to move more upward to leave a big gap thereunder to permit the water from the inlet 10 to flow and release out of the outlet 11 as shown in FIG. 9. When the actuator 12 is released all the elements inside the housing 5 will restore to their normal positions because of the resilience of the spring 15 and the water under the sealing ring 7 will enter into the upper portion again via the small hole 71. Since the water pressures on either side of the sealing ring became balanced, the water from the water inlet is blocked by the sealing ring 7 and could not flow to the outlet 11 before the next application of the actuator 12 (as shown in FIG. 8).

This discharge control device is adaptable to the close stools. Because the manual operation of an actuator is not so sanitary, an electronically operated discharge control device is therefore available. However, both of these discharge control devices have a common disadvantage of the non-durable sealing ring. For it very quickly becomes deformed because of the material fatigue.

SUMMARY OF THE PRESENT INVENTION

The present invention has a main object to provide a multi-operation discharge control device which includes a durable valve set to effectively control the discharge of flush water.

Another object of the present invention is to provide a multi-operation discharge control device which includes a actuator system to facilitate a manual operation of the device.

Still another object of the present invention is to provide a multi-operation discharge control device which includes an electromagnetic valve to facilitate an automatic operation of the device.

Accordingly, the multi-operation discharge control device of the present invention comprises a lower housing and an upper housing, a valve set slidably secured to the center of the upper housing including a tubular valve stem extending downward therefrom, a manual operation system slidably secured to a lateral extension of the lower housing for actuating the valve stem to move laterally to cause an unbalance of the water pressure between the valve set and a water inlet of the lower housing which forces the valve set to move upward to leave a gap to permit the water from the water inlet flowing to a outlet of the lower housing. The device further comprises an electronic switch disposed to the upper housing which is operated by a sensor to automatically operate the electromagnetic valve to affect the valve set from moving up or downward for permitting or stopping the water flowing from the inlet to the outlet of the lower housing. This device is also characterized in a synchronously operation of the sensor and the manual actuator.

The present invention will become more fully understood by reference to the following detailed description thereof when read in conjunction with the attached drawings.

DETAILED DESCRIPTION OF THE PREFERRED EMBODIMENT

Figure 1:
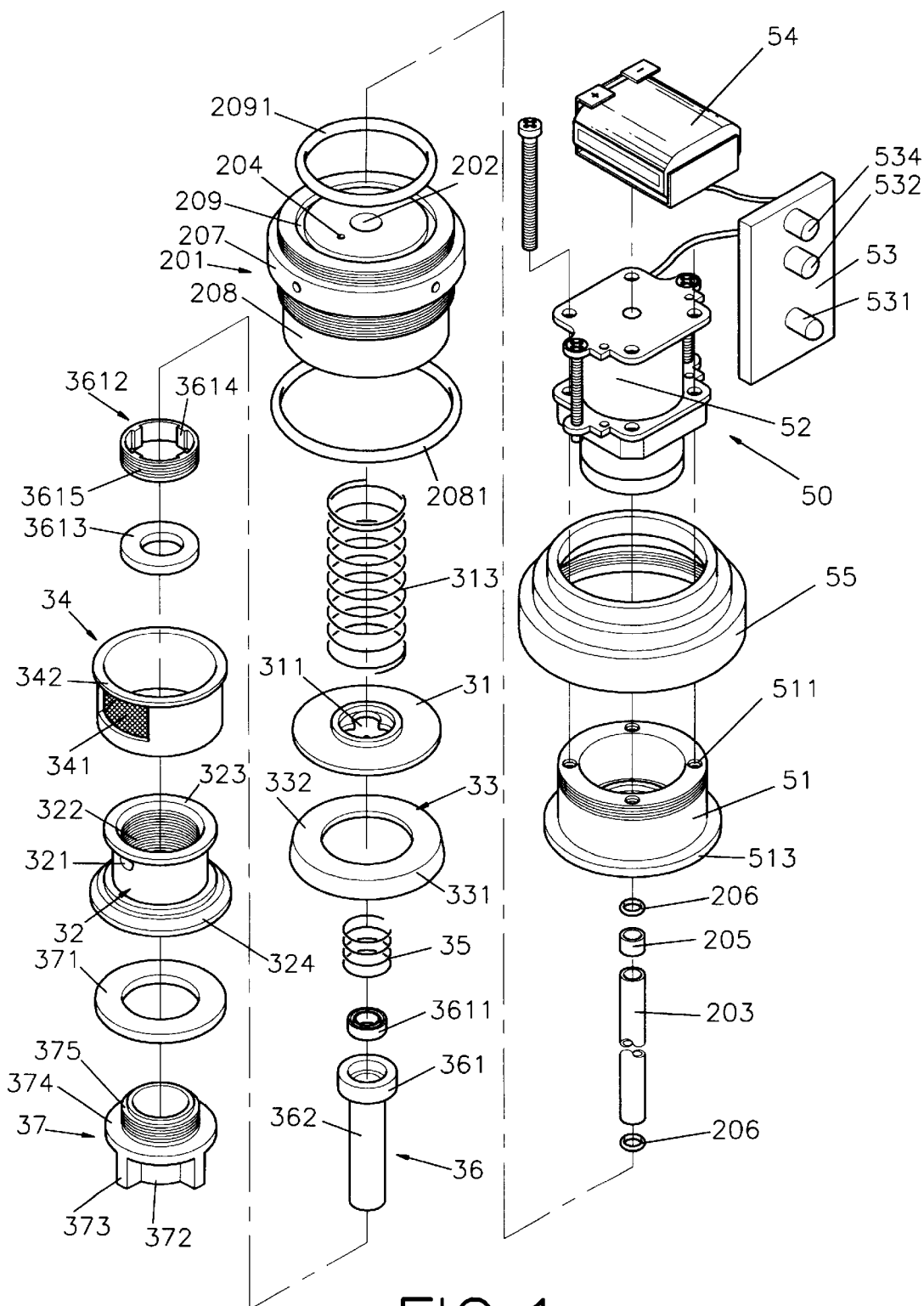
FIG. 1 is an exploded perspective view to show a preferred embodiment according the present invention.
Figure 2:
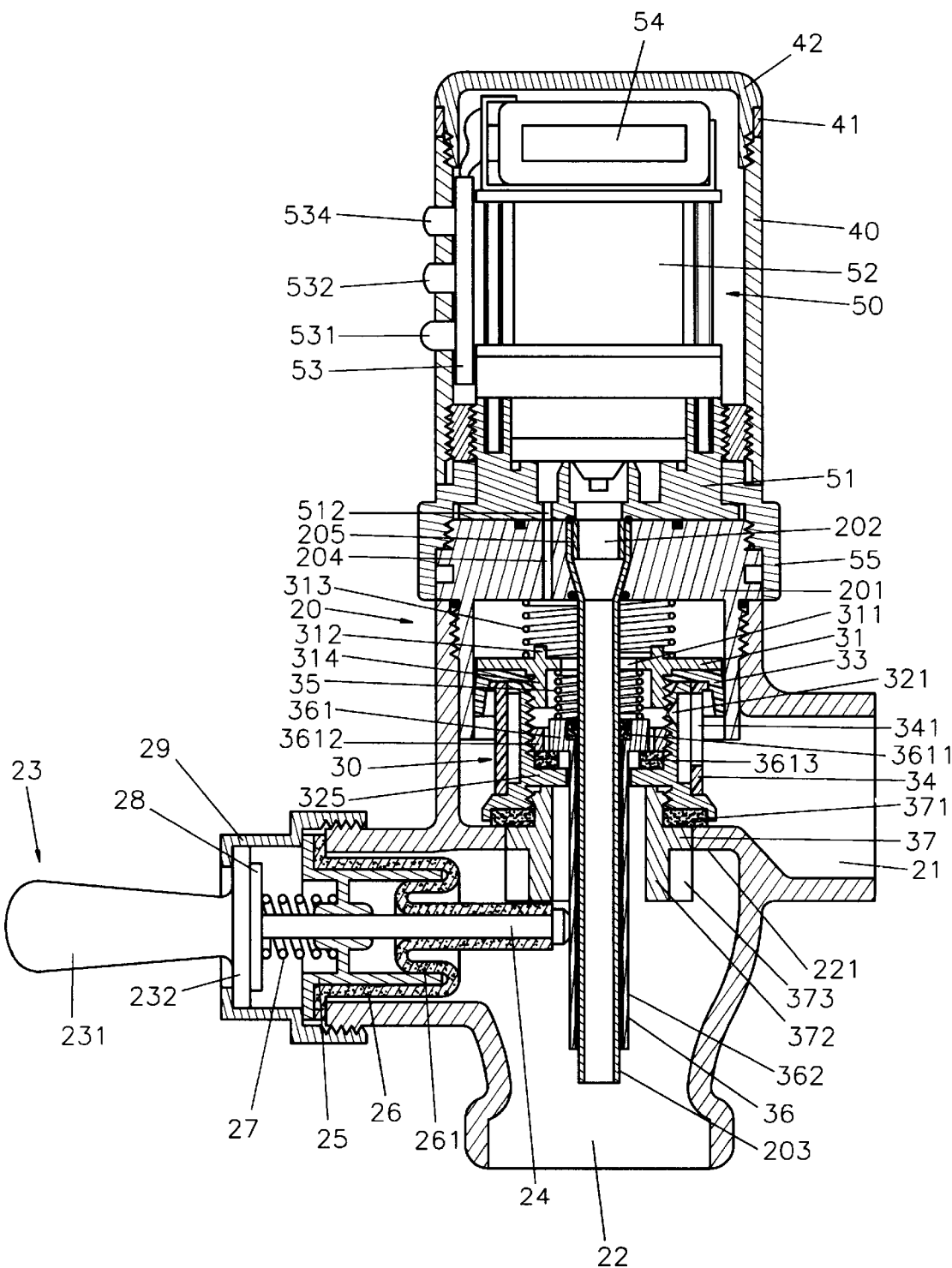
FIG. 2 is a sectional view to show an assemblage of the discharge control device of FIG. 1.

With reference to FIGS. 1 and 2 of the drawings, the multi-operation discharge control device of the present invention comprises a lower housing 20 axially connected to an upper housing 40 by a circular adaptor 201 and a stepped flare nut 55 with a flanged electromagnetic valve seat 51 disposed therebetween, a valve set 30 axially and slidably disposed at a longitudinal center of the lower housing 20 and an electronic operation system 50 axially disposed in the upper housing 40.

The lower housing 20 includes a water inlet 21 in a lateral side, a water outlet 22 in the bottom, a manual operation system slidably disposed in a lateral extension opposite to the water inlet 21 of the lower housing 20 and an inner flange 221 extending inward from an inner end of the water inlet 21 and the lateral extension.

The circular adaptor 201 includes a central bore 202 of tapered lower end for axially receiving a tube 203 of flexible material which is frictionally fastened in the upper end by a lashing ring 205, a pair of sealing rings 206 respectively fixed at two ends of the bore 202, a peripheral flange 207 having spaced recesses engaged with a lower inner periphery-of the stepped flare nut 55, a threaded upper periphery engaged with a threaded inner periphery of the nut 55, a tubular lower extension 208 having a threaded outer periphery engaged with an inner periphery of the lower housing 20 with a sealing ring 2081 engaged therebetween, a concentrical groove 209 in an upper surface in which a sealing ring 2091 is secured and a vertical aperture 204 between the central bore 202 and the groove 209 through the body of the adaptor 201 and aligned with the vertical aperture 512 of the electromagnetic valve seat 51 which includes a plurality of spaced screw holes 511 and a peripheral flange 513 abutting the bottom for engagement with the inner surface of a shoulder inside the stepped flare nut 55.

The valve set 30 includes a slidable circular plate 31 slidably engaged with the inner periphery of the tubular lower extension 208 of the adaptor 201 having a flower like central bore 311 sleeved on the flexible tube 203, a neck 312 projected upward from the bore 311 for engaging with lower end of a main spring 313 and a tubular extension 314 extended downward from the underside of the neck 312 including a threaded outer periphery engaged with a threaded inner periphery 322 of an inner sleeve 32 which includes an upper flange 323, a stepped lower flange 324 having a threaded inner periphery, an inner flange 325 extended inward from an inner periphery above the lower flange 324 and peripheral hole 321 in a vertical peripheral wall of the sleeve 32, an outer sleeve 34 sleeved on the stepped lower flange of the inner sleeve 32 having a filter 341 in a peripheral wall and an upper flange 342 extending outward from upper rim, a first reinforcement flanged ring 33 having an outer periphery 331 slidably engaged with the inner periphery of the tubular lower extension 208 of the adapter 201 and an inward flange 332 engaged between the lower surface of the circular plate 31 and the upper surfaces of the upper flange 323 of the inner sleeve 32 and the upper flange of the outer sleeve 342, a second reinforcement ring 3612 having a plurality of ribs 3614 spacedly projected inward from inner periphery and a threaded outer periphery 3215 engaged with a threaded inner periphery of the inner sleeve 32 with a sealing ring 3613 secured between the under side of the reinforcement ring 3612 and the upper surface of the inner flange 325 of the inner sleeve 32, a tubular valve stem 36 of copper material preriously and axially disposed into the inner sleeve 32 having a large diameter upper end 361 with a sealing ring 3611 therein movably engaged within the second reinforcement ring 3612 and biased by a subsidiary spring 35 and a hollow cylinder body 362 sleeved on the tube 203 and a passage ring 37 wrapped on the valve stem 36 having a lateral flange 374 extended outward from a middle outer periphery engageable with the inner flange 221 of the lower housing, a threaded upper periphery 375 engaged with the threaded inner periphery of the stepped lower flange 324 of the inner sleeve 32 with a sealing ring 371 secured therebetween and a plurality of lateral extensions 373 projected spaced apart from lower outer periphery 372 and under the flange 374.

A manual operation system transversely and slidably disposed in a lateral extension opposite to the water inlet of the lower housing 20. This system includes an actuator 23 of roughly T-shaped section having a handle bar 231 and a circular end 232 movably disposed into a flare nut 29 which engages free end of the lateral extension, a push rod 24 slidably disposed to a pair of first and second tubular supports 25 and 26 inside the lateral extension having a circular end 28 of a diameter less than that of the circular end 232 of the actuator 23 and stopped against the circular end 232 and biased by a compression spring 27. The forward end of the push rod 24 normally stops against an outer periphery of the valve stem 36.

Figure 3:
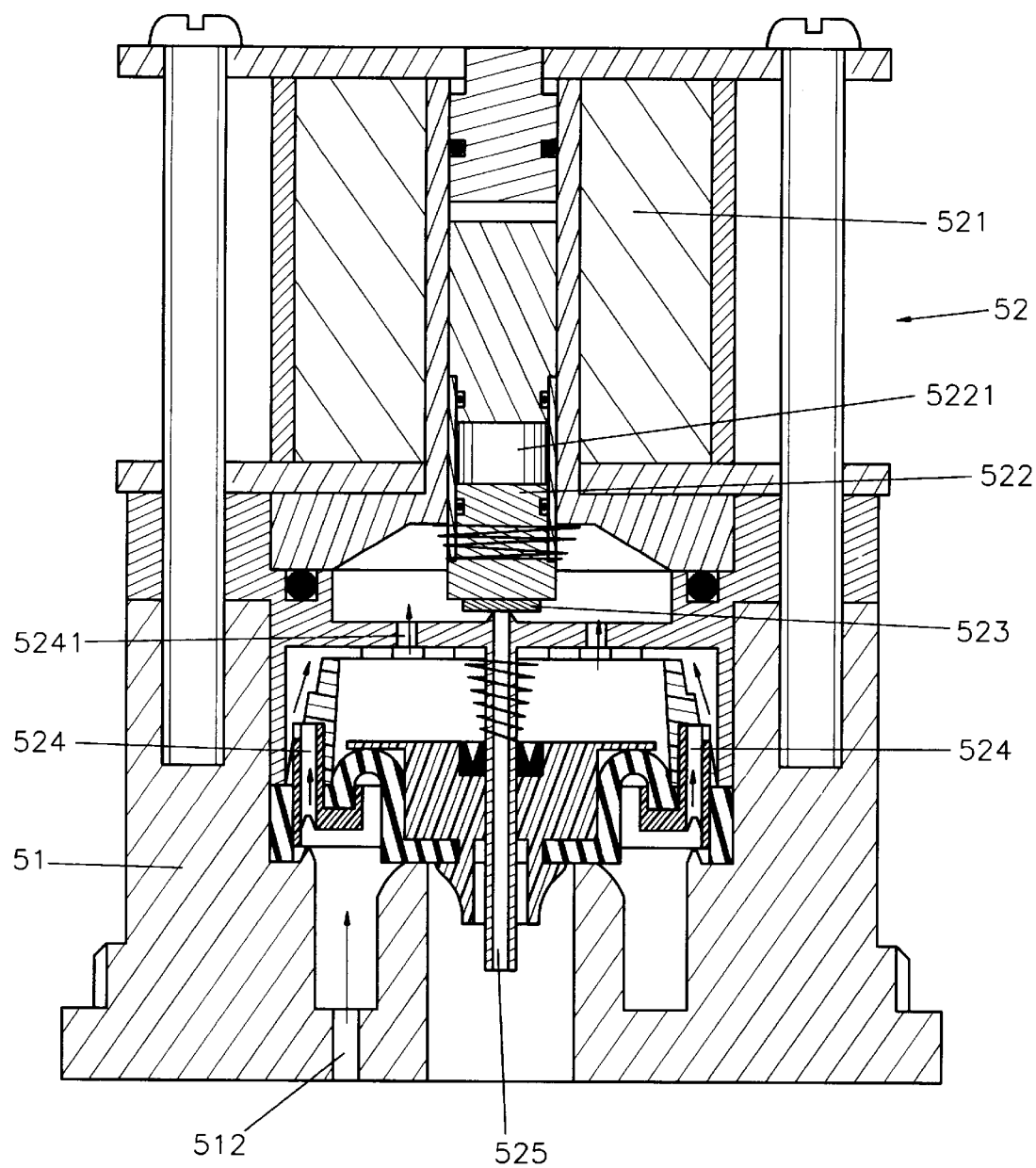
FIG. 3 is a sectional view illustrating an electronic switch of the present invention.

Referring to FIG. 3 and FIG. 2 again, the electronic operation system 50 axially disposed into the upper housing 40 and comprises an electromagnetic valve 52 connected to the electromagnetic valve seat 51, IC plate 53, a pair of sensors 531 and 532, an indicator 534, battery 54. Further the upper housing 40 includes a cap 42 fastened to the top of the housing 40 and secured by a fastening ring 41.

The electromagnetic valve 52 is of a conventional type and comprises a magnet coil 521, magnet bar 522 including a strong magnet 5221, piston 523, water inlet 524, water passage 5241 and water outlet 525.

Figure 4:
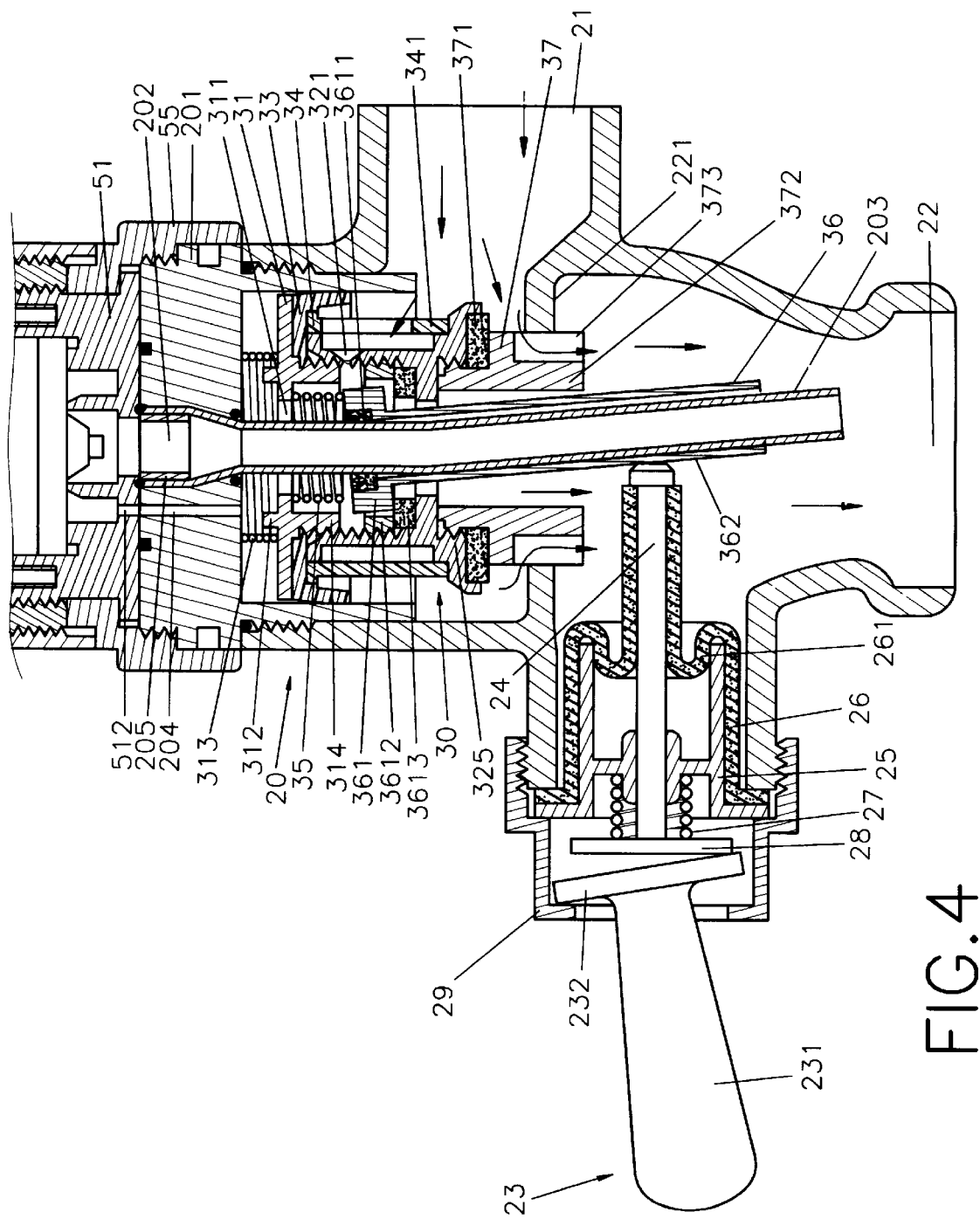
FIG. 4 is a sectional view illustrating the operation of the manual operation system according to the present invention.

Referring to FIG. 4 of the drawings which shows a manual operation mode of the discharge control device of the present invention. When the user presses the handle bar 231 of the actuator 23 laterally relative to the longitudinal orientation, its circular 232 will actuate the push rod 24 sliding forward to push the valve stem 36 including the tube 203 becoming tilted relative to the longitudinal orientation of the lower housing 20 and leaves a gap between the large diameter upper end 361 of the valve stem 36 and the sealing ring 3613 which induces the water from the inlet 21 to flow into the valve set 30 via the filter 341 of the outer sleeve 34 and the peripheral hole 321 of the inner sleeve 32 and releasing out of the above gap. So that the water pressures between the valve set 30 and the water inlet 21 become unbalanced and the valve set 30 is finally forced to move upward under great water pressure of the inlet 30 which connects to a large diameter water supply pipe and leaves a large gap between the passage ring 37 and the inner flange 221 of the lower housing 20 so as to permit a large amount of water discharging out of the water outlet via the spaces between the extensions 373 of the passage ring 37. When the user releases the handle bar 231 of the actuator 23. The push rod 24 slides back to its normal position under the resilience of the spring 27 and the valve stem 36 becomes straight apain relative to the longitudinal orientation of the lower housing 20 and its large diameter upper end 361 therefore closes the sealing ring 3613. This time, the valve set 30 under the resilience of the main spring 36 moves down to close the gap between passage ring 37 and the inner flange 221 of the lower housing 20. Since the balance of the water pressure between the valve set and the water inlet 21 is immediately restored, the water from the inlet 21 is prevented from flowing to the water outlet 22 before the next application of the actuator 23.

Figure 5:
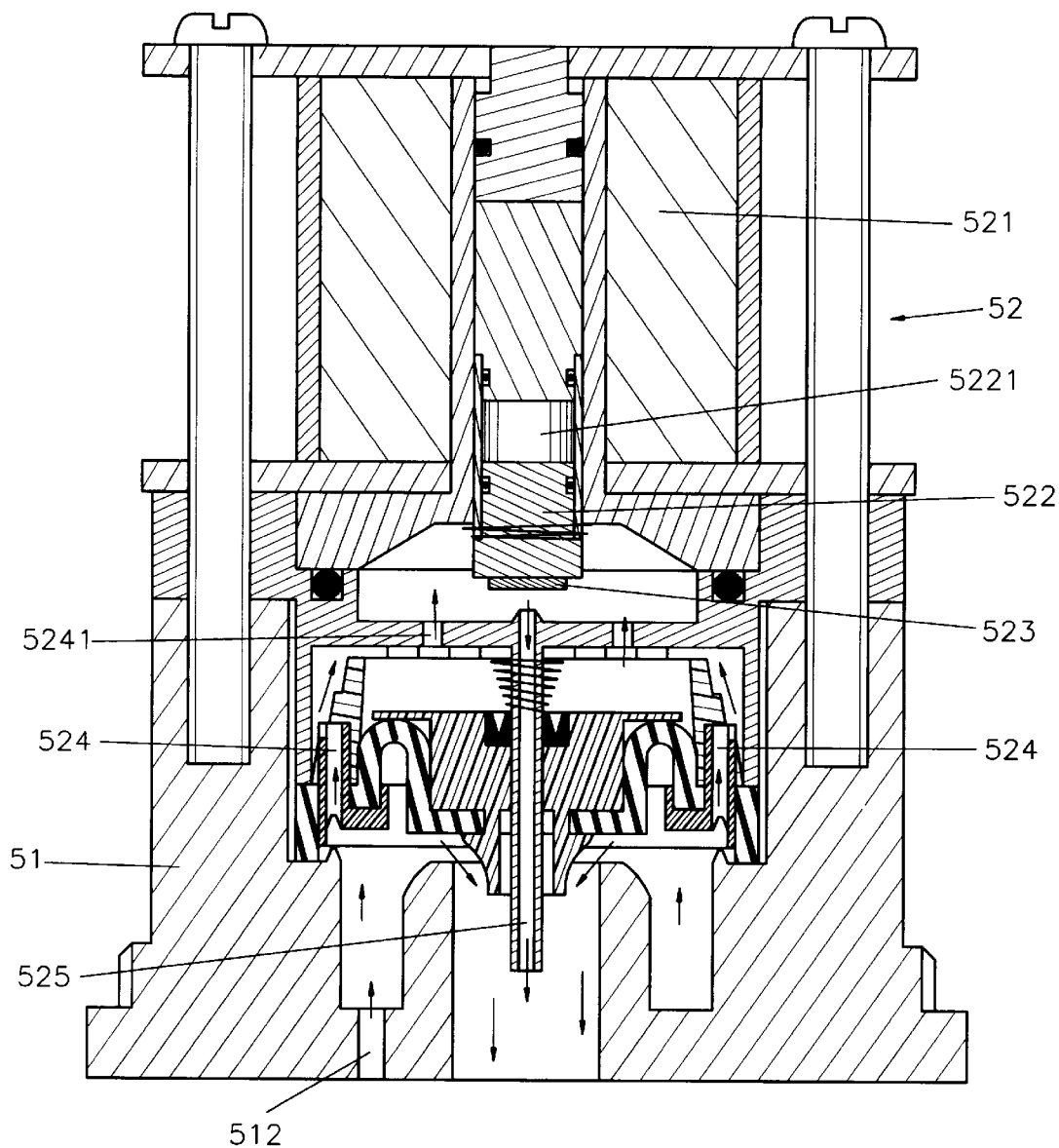
FIGS. 5 and 6 are the sectional views illustrating the operation of the electronic switch according to the present invention.
Figure 6:
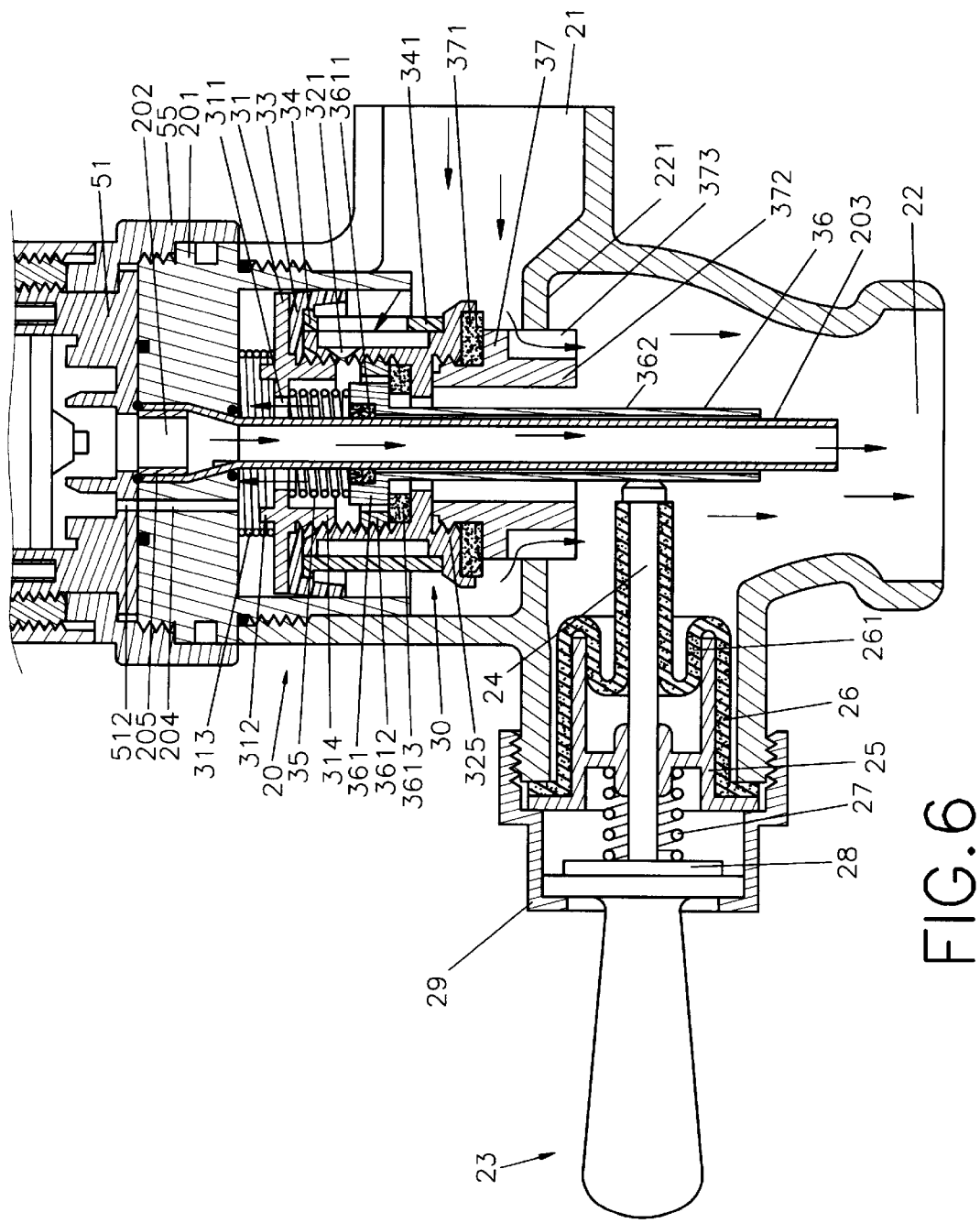

Referring to FIGS. 5 and 6 and FIG. 2 again, an automatic operation mode of the discharge control device of the present invention is shown. When a user approaches the device, the sensor 531 will emit infrared rays which is received by the sensor 532. When the user leaves, the IC plate 53 immediately transmits the information to the electromagnetic valve 52 which then actuates the magnet bar 522 moving upward so as to induce the water inside the valve set 30 entered into the electromagnetic valve via the vertical aperture 204 of the adaptor 201, the vertical aperture 512 of the electromagnetic valve seat 51, water inlet 524 and water passage 5241 and released via the water outlet 525 and the tube 203. This time, the water pressure inside the valve set 30 becomes weak and can not resist the water pressure from te water inlet 21 of the lower housing 20 which forces the valve set 30 moving upward to leave a big gap between the passage ring 37 and the inner flange 221 of the lower housing 20, therefore, discharging a large amount of flush water to the water outlet 22. When the water pressures between the valve set 30 and the water inlet 21 gradually become balanced, the passage ring 37 under the resilience of the main spring 35 closes the inner flange 221 again so that the water flow is slopped until next automatic operation.

The discharge control device of the present invention is characterized in that the central bore 311 of the slidable plate 31 introduces the water into the electromagnetic valve 52 via the vertical apertures 204 and 512, the outlet 525 and the tube 203 (prior art valve stem is solid) releases the water from the electromagnetic valve, in addition to the main spring 313.

These new and novel features enable the device to be operated manually or automatically. Once the battery 54 is failed, the device of the present invention is still workable by manual operation.

Figure 7:
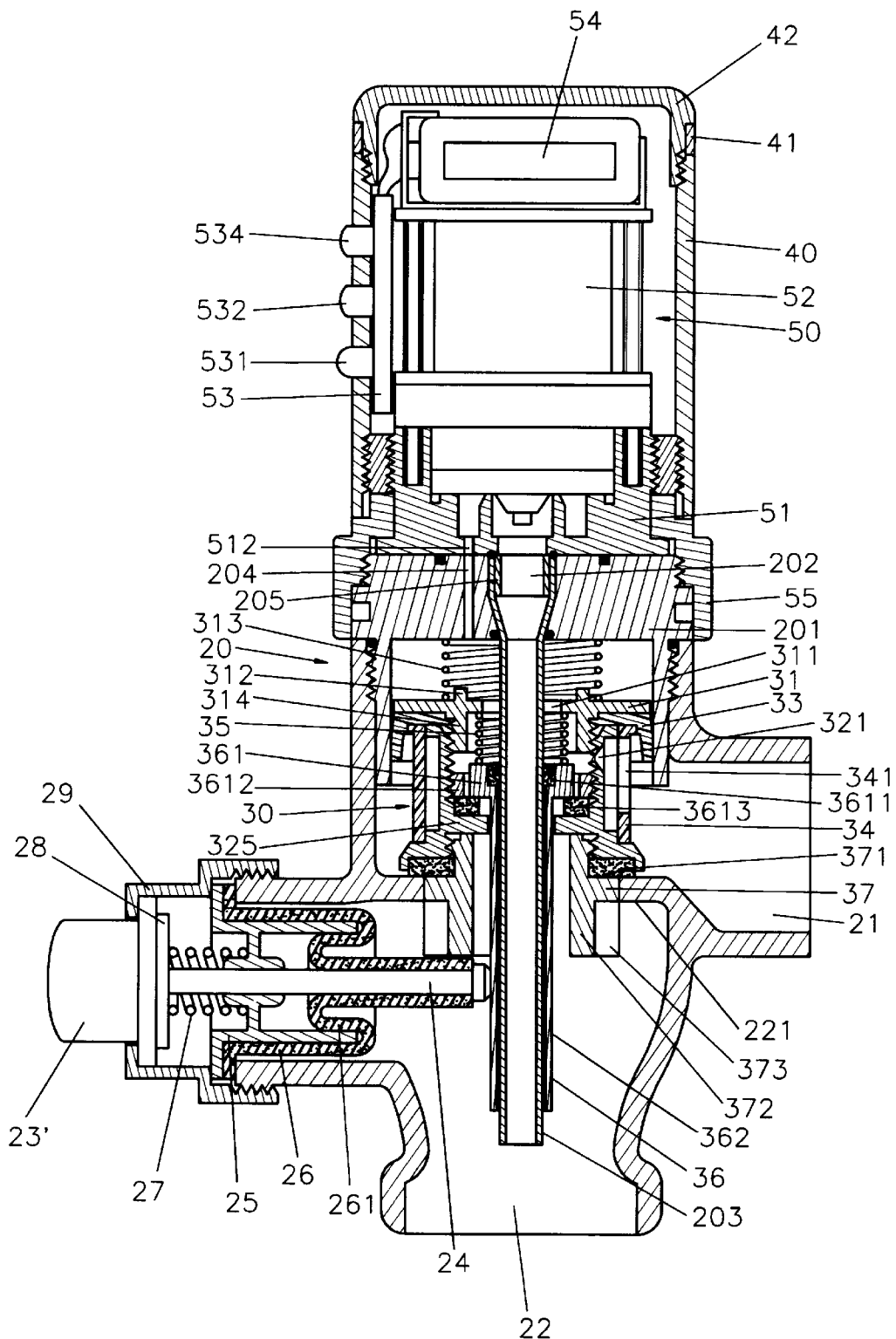
FIG. 7 is a sectional view to shown an alternative embodiment of the actuator which is replaced with a button.
Figure 8:
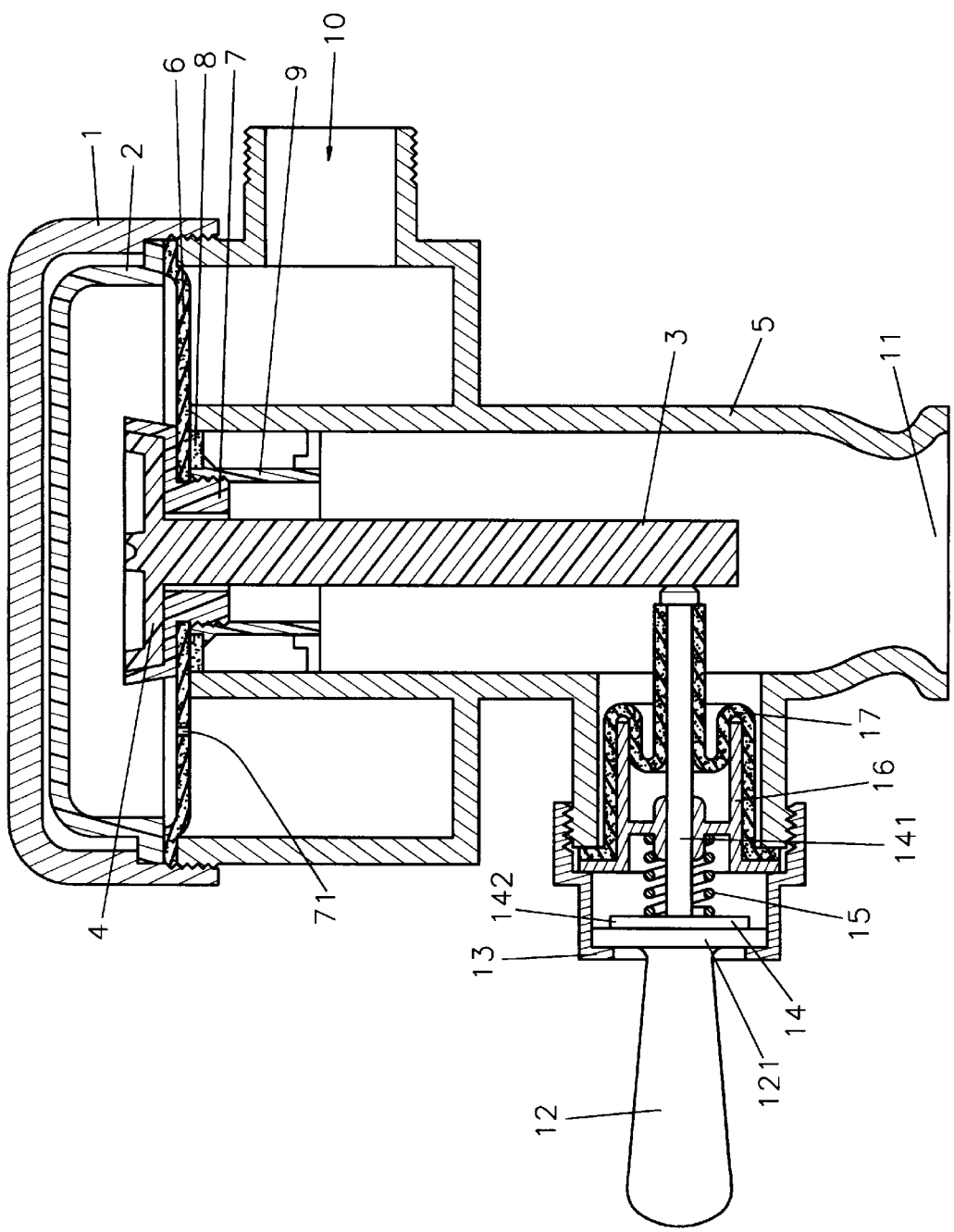
FIGS. 8 and 9 are the sectional views to show a discharge control device of a prior art.
Figure 9:
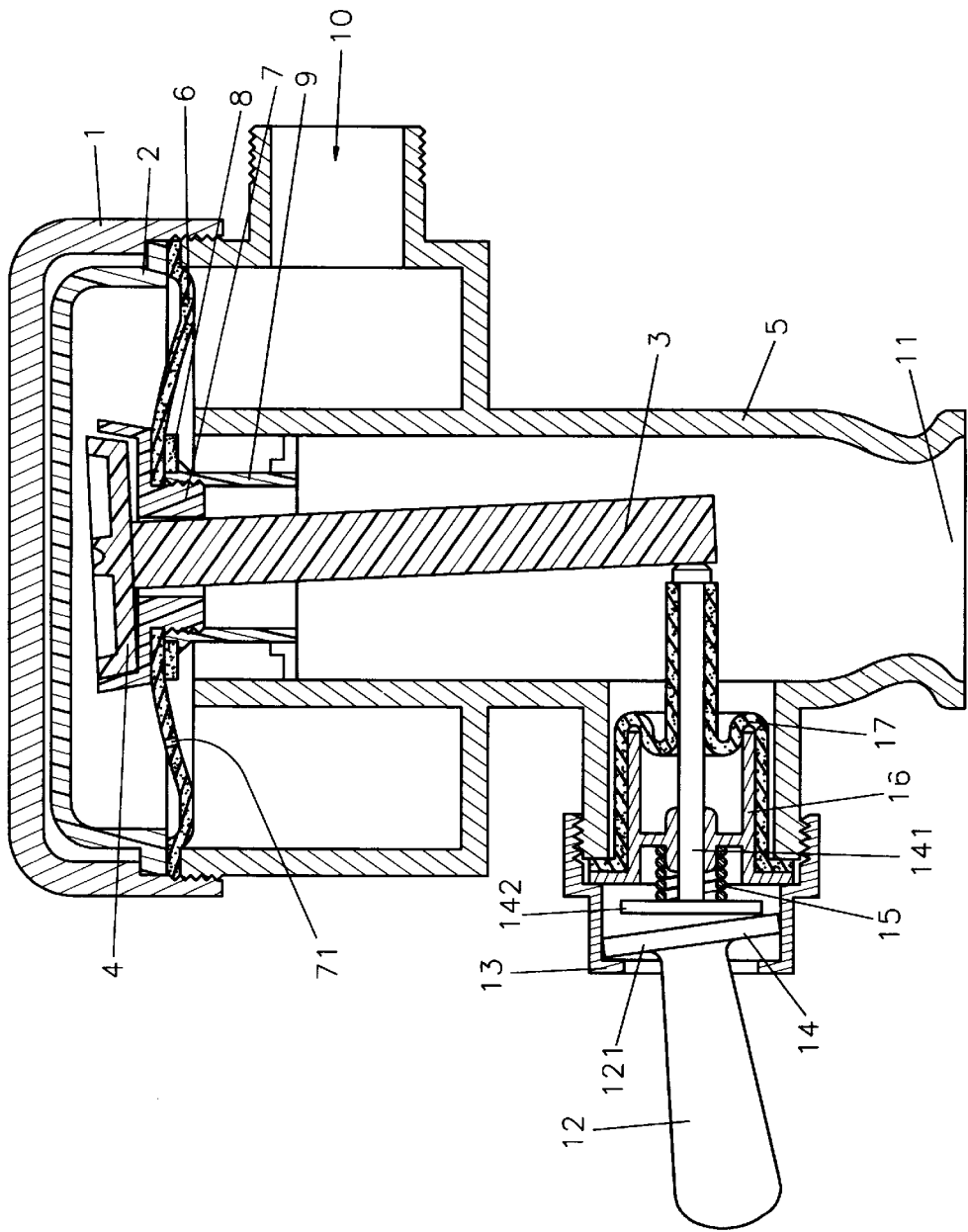

FIG. 7 shows an alternative embodiment of the actuator 23 which is replaced with button 23' which has the some function to actuate the push bar 24.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

I claim:

1. A device for controlling discharge of water comprising:

an upper housing axially connecting with a lower housing by a stepped flare nut and a circular adapter with an electromagnetic valve seat disposed therebetween;

said upper housing including a threaded inner periphery abutting upper rim to axially engage with a cap which has a threaded outer periphery engageable with said inner periphery and fixed by a fastening ring therearound, a plurality of first recesses formed spaced apart in a lateral peripheral wall and a threaded inner periphery abutting lower rim for engaging with an automatic operation system therein;

said automatic operation system comprising an IC plate at a lateral side including a pair of first and second sensor and an indicator engaged into said first recesses, a battery on the top, an electromagnetic valve beneath said battery and including a magnet coil, a magnet bar and a piston therein, a first small water inlet, a water passage, a first small water outlet and a first vertical aperture formed in said electromagnetic valve seat;

said lower housing comprising a threaded inner periphery abutting upper rim, a large water inlet extending outward from a lateral side and connected to an external water supply pipe, a large water outlet in the bottom, a lateral extension extended outward from a lateral side opposite to the large water inlet for slidably disposing a manual operation system therein, a first inner flange extending inward from an inner periphery above said lateral extension;

said stepped flare nut including a stepped outer periphery on an upper portion for engaging with the lower rim of said upper housing and a threaded inner peripheral beneath said stepped outer periphery;

said circular adapter including a peripheral flange extending outward from middle periphery engaged with an inner periphery of said stepped flare nut having a plurality of second recesses therein, a threaded outer periphery abutting upper end engaged with the threaded inner periphery of said stepped flare nut, a concentrical groove in upper surface for fixing a first sealing ring therein, a first tubular extension extending downward from underside having a threaded outer periphery engaged with the threaded inner periphery of said lower housing with a second sealing ring fixed therebetween, a first central bore abutting a tapered lower end for axially disposing an upper end of a flexible tube which is frictionally fastened by a lashing ring with a pair of third sealing rings respectively engaged in two ends of said central bore and a second vertical aperture formed between said central bore and said concentrical groove and made in alignment with said first vertical aperture of said electromagnetic valve seat;

said manual operation system comprising an actuating means including a handle bar and a large circular end movable disposed into the lateral extension of said lower housing and secured by a flanged nut, a pushing means axially and slidably disposed into a pair of first and second tubular supports inside said lateral extension, said pushing means including a push rod having a forward remaining inside said lower housing and a small circular end stopping against the large circular end of said actuating means and with a compression spring on inner surface;

a valve set axially disposed in an upper portion of said lower housing abutting said large water inlet;

said valve set comprising:

a slidable circular plate slidably engaged with an inner periphery of the first tubular extension of said circular adapter and including flower like second central bore sleeved on said flexible tube, a neck projected upward from said second central bore for engaging with a lower end of a main spring and a threaded second tubular extension extending downward from underside of said neck;

an inner sleeve including a threaded inner periphery engaged with threaded second tubular extension of said circular plate, an upper flange, a stepped lower flange having a threaded inner periphery, an inner flange extending inward from an inner periphery above said stepped lower flange and a peripheral hole in a vertical peripheral wall of said inner sleeve;

an outer sleeve sleeved on the stepped lower flange of said inner sleeve, an upper flange extending outward from upper rim and a filter in a peripheral wall thereof;

a first reinforcement flanged ring having an outer periphery slidably engaged with an inner periphery of the first tubular lower end of said circular adapter and an inward flange engaged between an underside of said circular plate end upper surfaces of the upper flange of said inner sleeve and the upper flange of said outer sleeve;

a second reinforcement ring having a threaded outer periphery engaged with the threaded inner periphery of said inner sleeve with a fourth sealing ring secured thereunder and a plurality of ribs formed spaced apart around inner peripheral wall;

a fifth sealing ring engaged an underside of the stepped lower flange of said inner sleeve abutting an upper surface of the inner flange of said lower housing;

a tubular valve stem of copper material previously and axially disposed into said inner sleeve having a hollow cylinder body sleeved on said flexible tube and stopped against the forward end of said push rod and a large diameter upper end with a sixth sealing ring movably engaged within said second reinforcement ring and biased by a subsidiary spring;

a passage ring sleeve on said valve stem and having a threaded outer periphery abutting upper rim engaged with the threaded inner periphery of the stepped lower flange of said inner sleeve, a lateral flange extending outward from a middle outer periphery engaged with the inner flange of said lower housing and a plurality of lateral extensions extending spaced apart from lower outer periphery under said lateral flange;

whereby, said manual operation and said automatic operation system selectively actuate said valve set moving upward to define a water passage thereunder for permitting the water from the large water inlet flowing to the large water outlet of said lower housing.

2. The device as recited in claim 1 wherein said actuating means is a button.

* * * * *